Patented Nov. 9, 1948

2,453,672

UNITED STATES PATENT OFFICE 2,453,672

ALKAMINE ESTERS OF PYRROLE-3,4-DICARBOXYLIC ACIDS

Donald E. Sargent, Easton, Pa., assignor to American Cyanamid Company, New York, N. Y., a corporation of Maine No Drawing. Application November 13, 1946,
Serial No. 709,407

6 Claims. (Cl. 260—313)

This invention relates to alkamine esters of 1-dialkylaminoalkyl-pyrrole-3,4-dicarboxylic acids.

A number of alkyl esters of pyrrole carboxylic acids have been prepared, but the alkamine esters could not be made by ordinary procedures. It is with these esters that the present invention is concerned and they may be represented by the following structural formula:

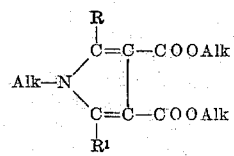

in which R and $R^1$ are hydrogen or alkyl and Alk is dialkylaminoalkyl. The esters of the present invention are useful for a number of purposes, some being activators for rubber accelerators, and others exhibiting local anaesthetic power.

In general the esters of the present invention can be prepared by catalyzed alcoholysis of the corresponding alkyl esters using an alkali metal alcoholate as the catalyst. The alkyl ester may be prepared by a generally known procedure, notably the condensation of dialkylaminoalkyl amines with a diacylsuccinate. The simplest and most readily prepared compounds are the ethyl esters of 2,5-dimethylpyrroles which may be obtained by condensing diethyldiacetosuccinate with dialkylaminoalkyl amines. Other substituents in the 2,5 position may be prepared by using other diacylsuccinates, such as dipropionosuccinates and the like. The general reaction is described by Knorr, Berichte vol. 18, pages 299 et seq, the dialkylaminoalkyl amine being used in place of the alkyl and aryl amines described by Knorr.

The alkamine esters of the present invention are obtainable in the form of the free bases or in the form of their salts, such as hydrochlorides. When used as local anaesthetics the latter form is preferred as it is in general more water soluble. The free bases, however, show greater effectiveness as activators for rubber accelerators.

The invention will be illustrated in greater detail in conjunction with the following specific examples which are typical illustrations. The parts are by weight and temperatures are uncorrected unless otherwise specified.

EXAMPLE 1

β - diethylaminoethyl-1 - (β-diethylaminoethyl) - 2,5-dimethylpyrrole-3,4-dicarboxylate

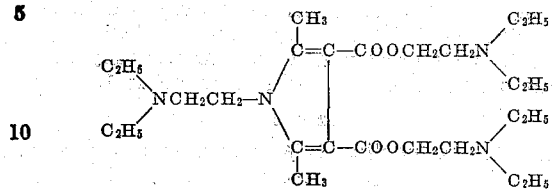

50 parts of ethyl 1-(β-diethylaminoethyl)-2,5-dimethylpyrrole-3,4-dicarboxylate (prepared by condensing diethyldiacetosuccinate with B-diethylaminoethyl amine are mixed with 175 parts of β-diethylaminoethanol to which a small amount of sodium has been added. The reaction mixture is heated, ethyl alcohol beginning to distill off at 78° C. After the temperature reaches 161° C., when β-diethylaminoethanol begins to distill over, the pressure is reduced to 3 mm. and all of the unreacted diethylaminoethanol removed.

A residue is obtained in the form of a dark brown oil, which is fractionally distilled under about 3 mm. pressure, a light yellow oil being obtained boiling between 225–230° C. (corr.). This oil does not tend to crystallize on long standing and is soluble in benzene, ethyl alcohol and acetone and dilute acids. It is moderately soluble in ether and insoluble in water.

When an anhydrous ether solution of the base is treated with dry hydrogen chloride the dihydrochloride precipitates out in the form of a more or less crystalline hygroscopic salt.

When the above process is carried out, using the dimethyl ester instead of the diethyl ester, the same products are obtained and the reaction conditions are the same except that the temperature of reflux corresponds to that of methyl alcohol instead of ethyl alcohol.

EXAMPLE 2

β - diethylaminopropyl-1-(β-diethylaminoethyl) - 2,5-dimethylpyrrole-3,4-dicarboxylate

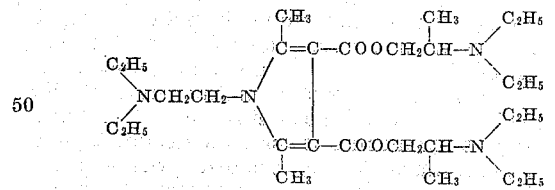

The procedure of Example 1 is followed but an equivalent amount of β-diethylaminopropanol is substituted for the β-diethylaminoethanol.

EXAMPLE 3

*β - diethylaminoethyl-1-(γ-diethylaminopropyl)-
2,5-dimethylpyrrole-3,4-dicarboxylate*

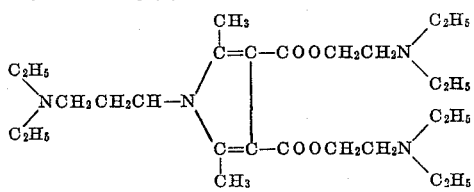

52 parts of ethyl-1-(γ-diethylaminopropyl)-2,5-dimethylpyrrole-3,4-dicarboxylate (prepared by the method described in Example 1, but substituting γ-diethylaminopropyl amine instead of the β-diethylaminoethyl amine and 175 parts of B-diethylaminoethanol to which a small amount of sodium has been added are heated up. Ethyl alcohol begins to distill over at 78° C. and after the temperature reaches about 161° C., when the excess β-diethylaminoethanol begins to distill over, the pressure is reduced.

The crude product is an oil which is fractionally distilled under 3 mm. pressure. A little yellow oil is obtained which has substantially the same properties as the ester of Example 1.

EXAMPLE 4

*β-dimethylaminoethyl-1-(β-diethylamino-ethyl)-
2,5-dimethylpyrrole-3,4-dicarboxylate*

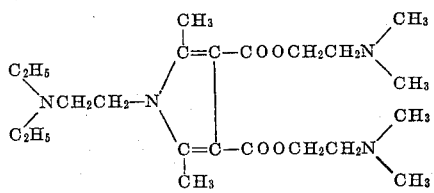

The procedure of Example 1 is followed, substituting a stoichiometrically equivalent amount of β-dimethylaminoethanol for the 175 parts of β-diethylaminoethanol. A dark brown oil is obtained which on distillation under a high vacuum becomes a lighter yellow. Its properties are substantially the same as those of the product of Example 1.

EXAMPLE 5

*γ-dipropylaminopropyl-1-(β-diethylaminoethyl)-
2,5-dimethylpyrrole-3,4-dicarboxylate*

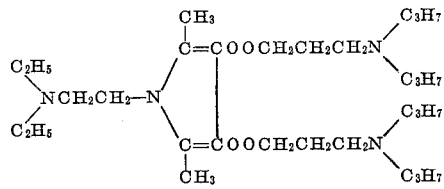

The procedure of Example 1 is followed but an equivalent amount of γ-dipropylaminopropanol is substituted for the β-diethylaminoethanol. A high boiling point is obtained similar in its properties to the product of Example 2.

In the foregoing examples the catalyst sodium is added to the β-dialkylaminoalkanol where it, of course, reacts to produce the alcoholate. The addition of the sodium is in no sense critical. It may be added to the reaction mixture, or it may be reacted either with the amino alcohol or with ordinary ethyl alcohol to form an alcoholate and the ready formed alcoholate added to the reaction mixture. The relative insensitiveness of the reaction to the method of addition of the sodium alcoholate and the smoothness of the reaction is in marked contrast to the ordinary characteristics of amino alcohols and their esters, which usually are sensitive to oxidation in alkaline solution. No reason is advanced here why the present reaction proceeds readily in spite of this normal tendency to side reactions.

The amount of alkali metal alcoholate present is not critical, but it should be in catalytic amounts, that is to say amounts which are sufficient to vigorously catalyze the reaction but far below stoichiometric proportions. Good results are obtained with amounts of alcoholate of the order of 1/10 mole per mole of the dicarbethoxypyrrole. This proportion is not critical and the term "catalytic amounts" will be used in the claims in its ordinary sense of small amounts far below stoichiometric proportions. Sodium can be replaced by potassium, but this presents no advantage in the reaction and, therefore, does not economically warrant the higher cost of potassium. For this economic reason the sodium alcoholate is preferred as the catalyst.

In many of the examples the hydrochlorides of the products are described. These salts are most readily prepared and where the product is of utility as a local anaesthetic are preferred because they are readily soluble in water. The esters, however, are capable of reacting with other strong acids to produce the corresponding salts.

This application is in part a continuation of my copending application, Serial No. 496,960, filed July 31, 1943 now abandoned.

I claim:

1. Compounds selected from the group consisting of esters of 1-dialkylaminoalkylpyrrole-3,4-dicarboxylic acids with dialkylamino alkanol and the acid addition salts of the esters with strong acids.

2. Compounds selected from the group consisting of esters of 1-dialkylaminoalkyl-2,5-dialkyl-pyrrole-3,4-dicarboxylic acids with dialkylamino alkanols and the acid addition salts of the esters with strong acids.

3. Compounds selected from the group consisting of esters of 1-dialkylaminoalkyl-2,5-dimethyl-pyrrole-3,4-dicarboxylic acids with dialkylamino alkanols and the acid addition salts of the esters with strong acids.

4. A member of the group consisting of β-diethylaminoethyl - 1 - (β-diethylaminoethyl)-2,5-dimethylpyrrole - 3,4 - dicarboxylate having the formula:

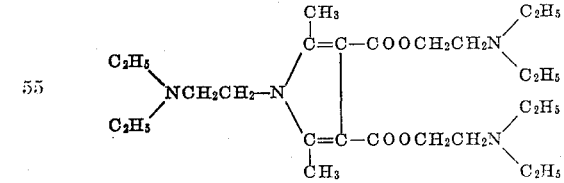

and its addition salts with strong acids.

5. A method of preparing an alkamine ester of 1-dialkylamino-alkylpyrrole-3,4-dicarboxylic acid which comprises heating the dialkyl ester of the same pyrrole-3,4-dicarboxylic acid with the desired dialkylamino alkanol in the presence of catalytic amounts of an alkali metal alcoholate.

6. A method of preparing an alkamine ester of a 1-dialkylaminoalkyl-2,5-dimethylpyrrole-3,4-dicarboxylic acid which comprises heating the dialkyl ester of the same pyrrole-3,4-dicarboxylic acid with the desired dialkylamino alkanol in the presence of catalytic amounts of an alkali metal alcoholate.

DONALD E. SARGENT.

No references cited.